May 24, 1932.     B. B. WHITTAM     1,859,857
WATER TUBE BOILER
Filed Feb. 6, 1928     6 Sheets-Sheet 3
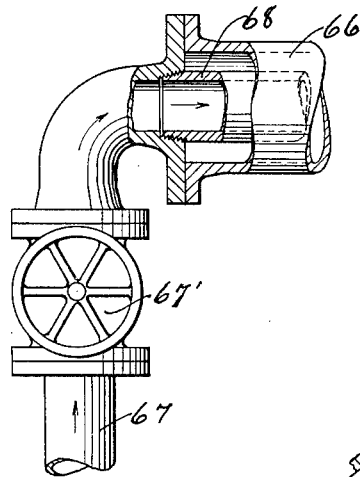
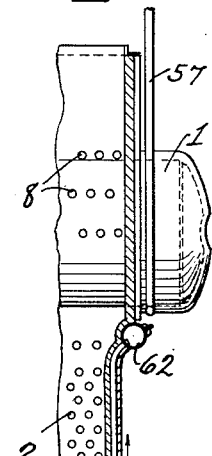
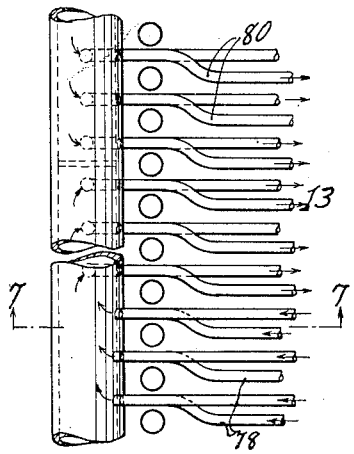
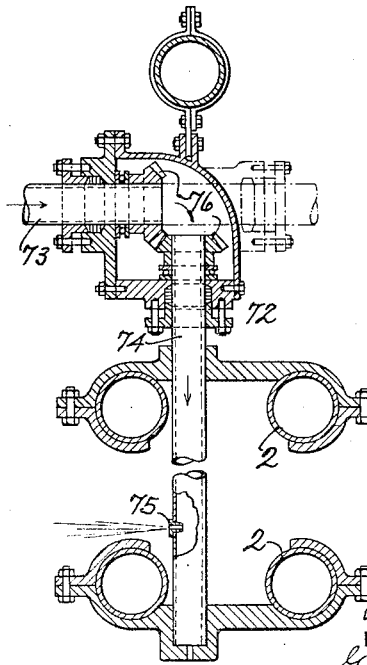
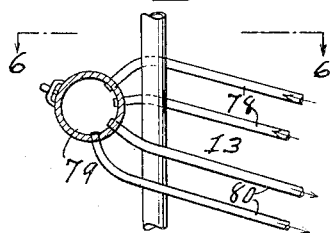
INVENTOR
Benjamin B Whittam
BY
Gifford + Scull
ATTORNEYS May 24, 1932. B. B. WHITTAM 1,859,857
WATER TUBE BOILER
Filed Feb. 6, 1928   6 Sheets-Sheet 4
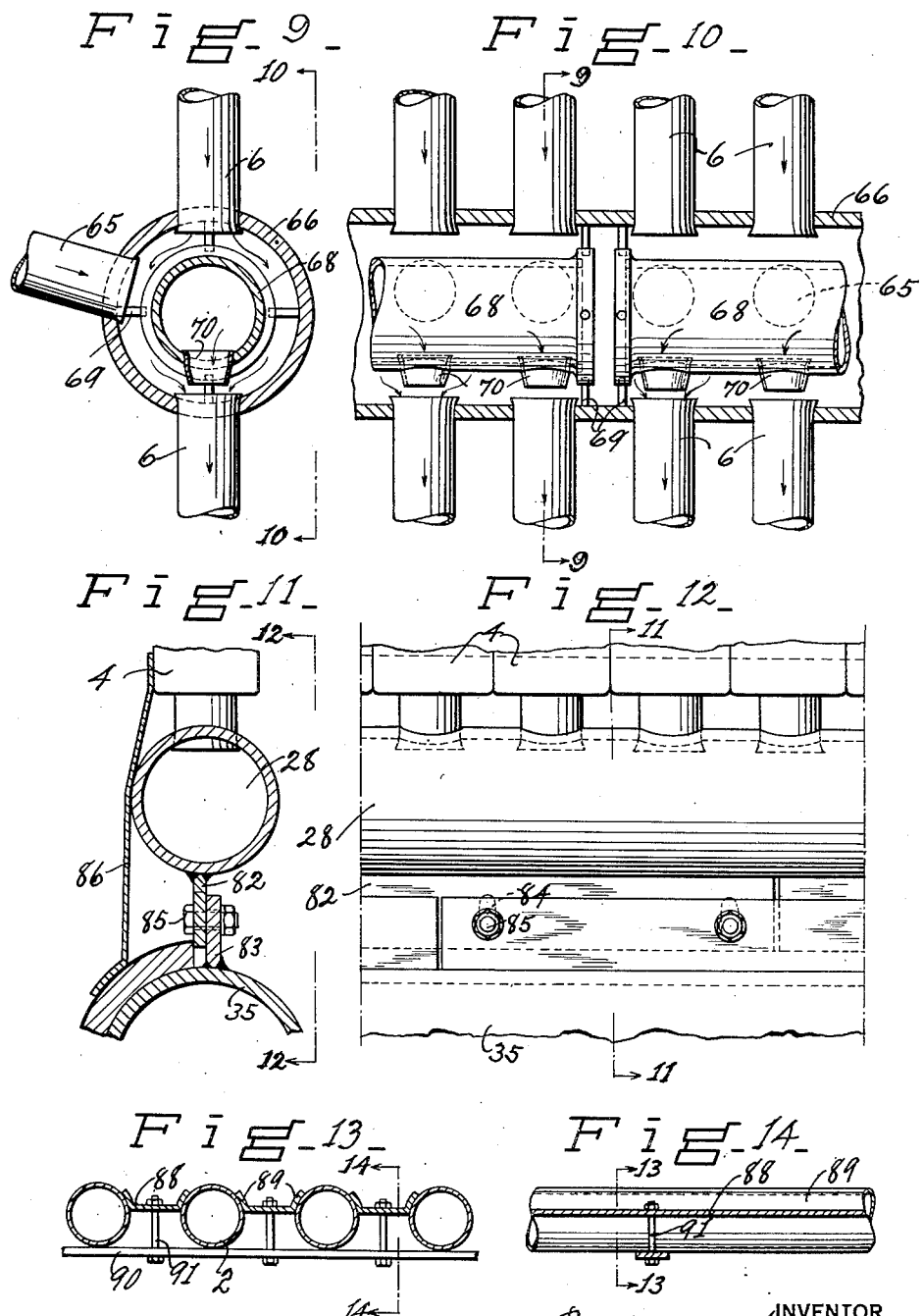
INVENTOR
Benjamin B. Whittam
BY
Gifford & Scull
ATTORNEYS

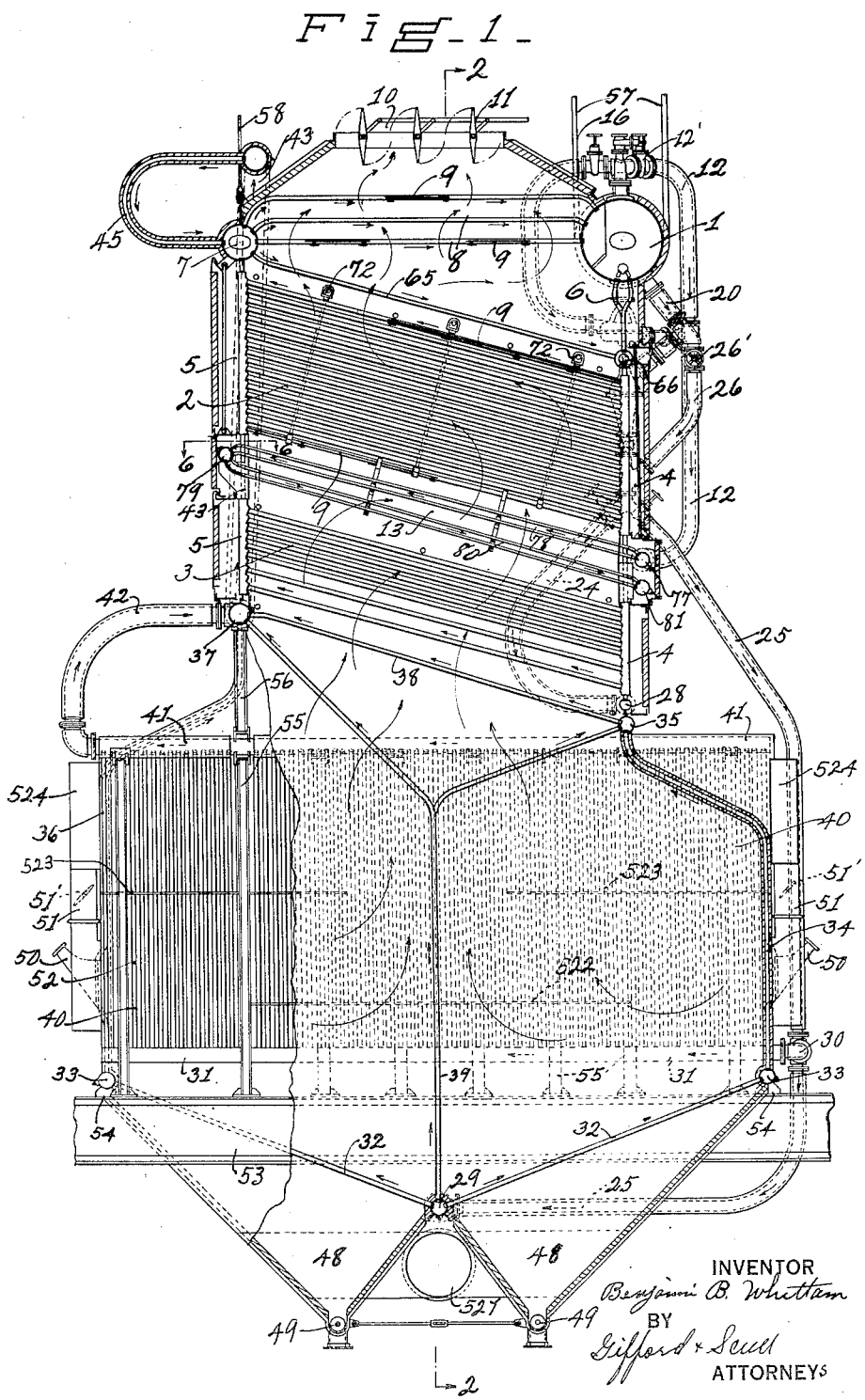

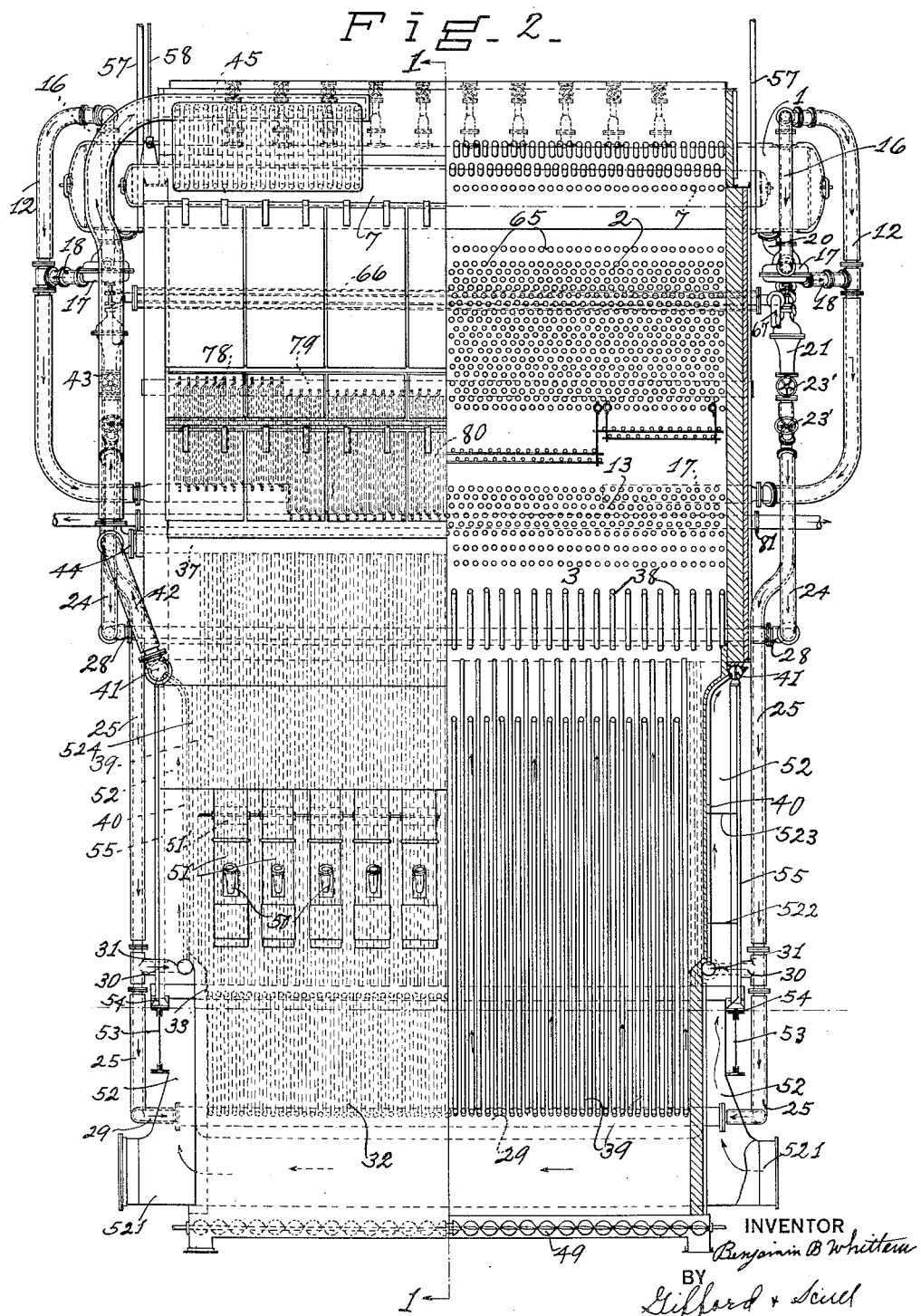

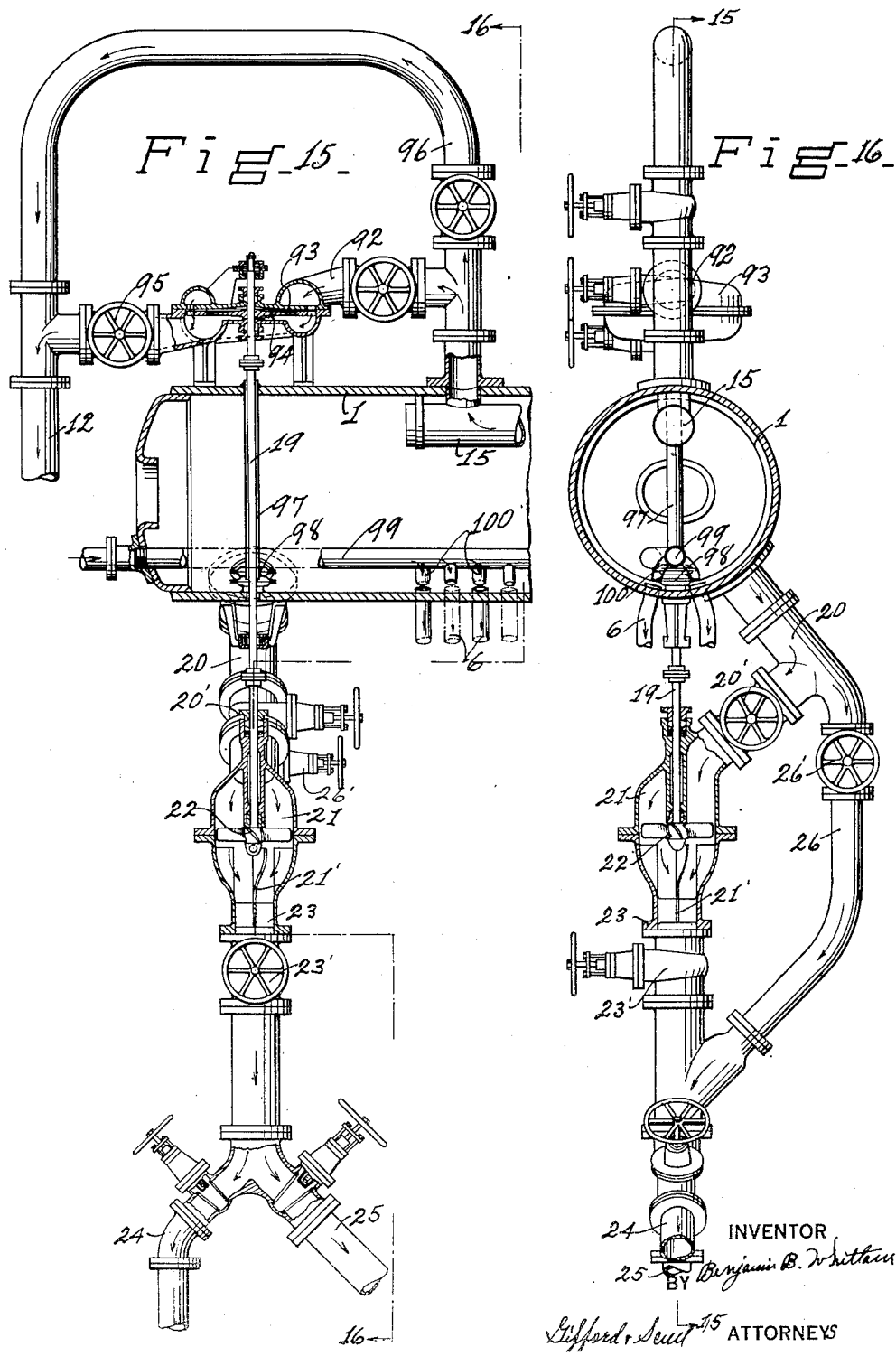

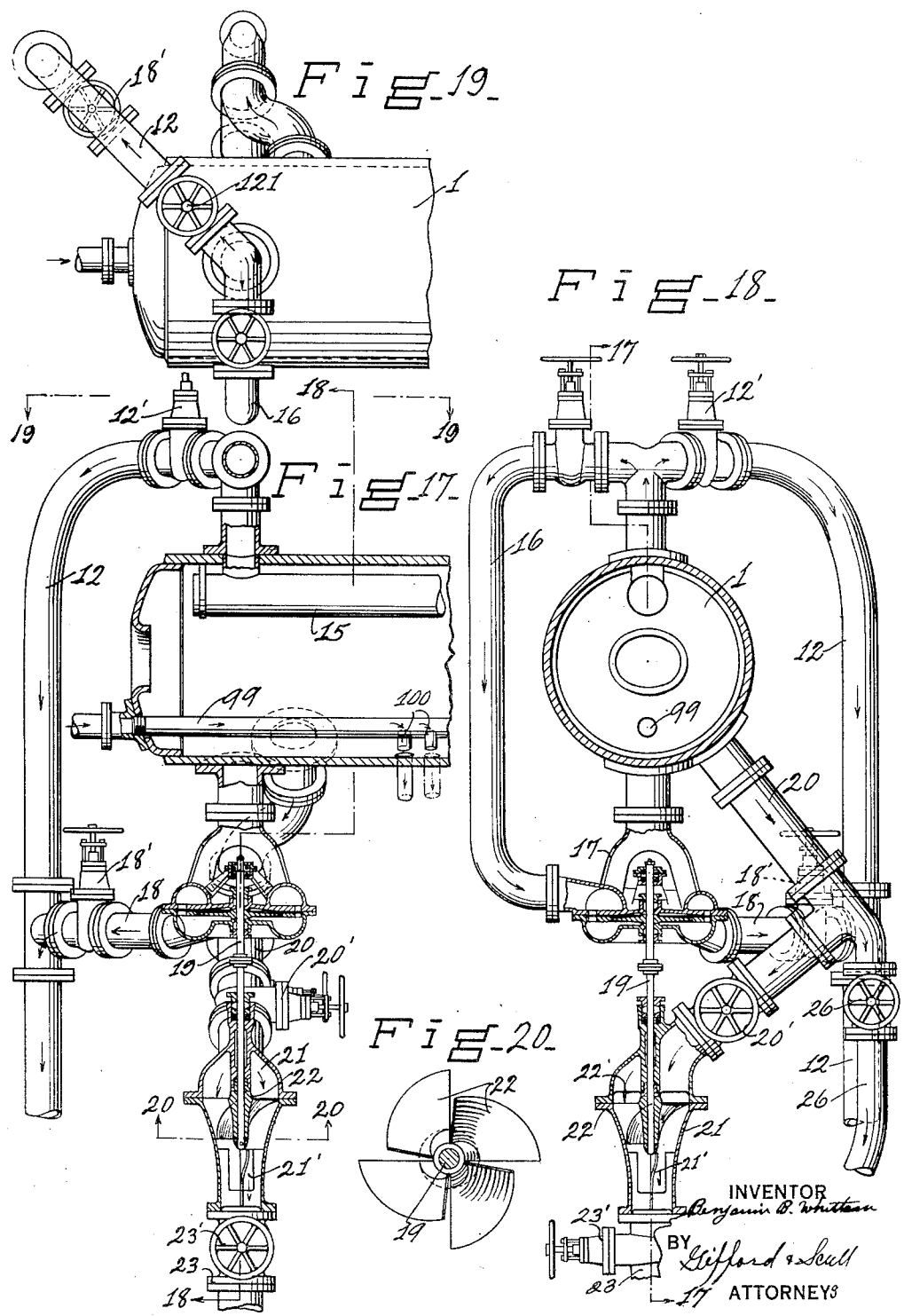

Patented May 24, 1932

1,859,857

UNITED STATES PATENT OFFICE

BENJAMIN B. WHITTAM, OF ELIZABETH, NEW JERSEY, ASSIGNOR TO THE BABCOCK & WILCOX COMPANY, OF BAYONNE, NEW JERSEY, A CORPORATION OF NEW JERSEY

WATER TUBE BOILER

Application filed February 6, 1928. Serial No. 252,063.

This invention relates to a water tube boiler that is provided with a natural circulation system with means to accelerate the natural circulation and is also provided with a forced circulation system.

The invention will be understood from the description in connection with the accompanying drawings, in which Fig. 1 is a side view, partly in section, along the line 1—1 of Fig. 2, showing an illustrative embodiment of the invention; Fig. 2 is a part outside view and part section along the line 2—2 of Fig. 1; Fig. 3 is an alternate arrangement of the upper side walls and shows a vertical section through one of the walls partly broken away; Fig. 4 is a section showing one of the details on an enlarged scale; Fig. 5 is a side view, partly broken away and partly in section, showing a feed water inlet; Fig. 6 is a plan view showing some of the details of the superheater, taken along the line 6—6 of Fig. 1 and Fig. 7; Fig. 7 is a section along the line 7—7 of Fig. 6; Fig. 8 is a view, partly in section and partly broken away, showing details of the soot blowers; Fig. 9 is a section through the feed water inlet header, taken along the line 9—9 of Fig. 10; Fig. 10 is a side view, partly broken away, of the feed water inlet header, taken along the line 10—10 of Fig. 9; Fig. 11 is a section, partly broken away, showing one of the expansion joints between the mud drum 28 and header 35, taken along the line 11—11 of Fig. 12; Fig. 12 is a side view, partly broken away, showing the same expansion joint; Fig. 13 is a section through one of the baffles, taken along the line 13—13 of Fig. 14; Fig. 14 is a section along the line 14—14 of Fig. 13; Fig. 15 is a side view, partly in section, showing an embodiment illustrating the forced circulation, taken along the line 15—15 of Fig. 16; Fig. 16 is a section along the line 16—16 of Fig. 15; Fig. 17 is a sectional view similar to Fig. 15, showing a modification, taken along the line 17—17 of Fig. 18; Fig. 18 is a section along the line 18—18 of Fig. 17; Fig. 19 is a plan view taken along the line 19—19 of Fig. 17, and Fig. 20 is a section along the line 20—20 of Fig. 17.

In the drawings, reference character 1 indicates the steam and water drum of a water tube boiler of a well-known type that is provided with banks of inclined tubes 2 and 3 separated from each other to provide a space for a superheater. The banks of tubes 2 and 3 are connected to downtake headers 4 and uptake headers 5. The upper ends of the downtake headers 4 are connected by means of the nipples 6 to the water space of the steam and water drum 1, and a feed water header may be interposed in these nipples, as will be described below. The upper ends of the uptake headers 5 are connected by nipples to a separating drum 7 that is, in turn, connected by the circulating tubes 8 to the steam and water drum 1. Baffles 9 are provided to direct the gases across the tubes and into the outlet 10 to the stack, the outlet being provided with the dampers 11. Pipes 12 provided with valves 12' extend from near opposite ends of the steam space of the steam and water drum 1 to the superheater 13. A dry pipe 15 (Fig. 17) is located in the steam space of the steam and water drum 1 and is connected to the pipes 12. Branch pipes 16, provided with valves, extend from the T or junction fittings to turbines 17, and exhaust pipes 18 extend from the turbines 17 to the pipes 12, these exhaust pipes being provided with valves 18'. The turbines may be supported by having their casing attached to projections welded or otherwise fastened to the drum 1. The turbine shafts 19 extend vertically and are connected to centrifugal pumps 22 for circulating the water. Tubes 20 extend from near opposite ends of the water space of the steam and water drum 1 to the turbine casings 21, these tubes 20 being provided with valves 20'. The centrifugal pump casings 21 are provided along their inner surfaces with longitudinally extending fins 21' to cause the water to flow axially through the casings 21. The impeller blades 22 of the centrifugal pumps are located in the casings 21 and are driven by the shafts 19 from the turbines 17. Discharge pipes 23 provided with valves 23' extend from the pump casings 21 and are connected to valved branch pipes 24 and 25. A by-pass pipe 26 is provided from each pipe 20 around the centrifugal pumps to the discharge pipe 23, and a valve 26' is provided in each by-pass 26.

The branch pipes 24 lead to opposite ends of a cross header 28 that is located at the lower ends of the downtake headers 4 and is connected to these headers by nipples (Figs. 1, 2 and 12). The branch pipes 25 lead to opposite ends of a cross header 29 that is located below the central part of the boiler furnace. Branches 30 lead from the pipes 25 to the ends of headers 31 located on opposite sides of the lower portion of the furnace. Rows of inclined slag screen tubes 32 extend from opposite sides of the header 29 to headers 33 located along the lower edges of the walls of the furnace. A row of side wall tubes 34 extends upwardly and thence inwardly from one of the headers 33 to the upper header 35. A row of side wall furnace tubes 36 extends upwardly and thence inwardly from the other header 33 to the upper header 37. A plurality of inclined tubes 38 connects the headers 35 and 37.

A central row of tubes 39 extends upwardly from the header 29 through the furnace and the upper ends of alternate tubes are bent to inclined positions and enter the headers 35 and 37, respectively. Rows of side wall furnace tubes 40 extend upwardly from the headers 31 to the headers 41. A pipe 42 extends from one end of each of headers 41 to the pipes or headers 43 and the ends of header 37 are connected by T's 44 to the pipes or headers 43. The upper ends of the pipes or headers 43 are bent horizontally and extend parallel to the drum 7. Rows of U-shaped tubes 45 connect the horizontally extending portion of the pipes or headers 43 to the drum 7.

The lower portion of the furnace is provided with ash hoppers 48 with screw conveyors 49 located in the bottom thereof for removing the ashes.

Cold air enters the compartments 52 located on opposite sides of the furnace through an inlet 521 that is connected to a fan (not shown). The air becomes heated as it passes upwardly and around the ends of horizontal baffles 522 and 523 in the compartments 52. The heated air passes into the cross compartments 524 located above the burners 50 and then passes downwardly through the inlets 51, that are provided with dampers 51', into the furnace.

I-beams 53 extend along the outside of the furnace at the lower portion thereof and supports 54 are provided thereon upon which the headers 33 rest. Vertical supports 55 extend from the I-beams 53 to the headers 41. Perforated strips 41' are provided in the headers 41 to prevent the same from collapsing because of the weight of the furnace walls that rest upon these headers, and vertical supports 56 extend from the headers 41 to the header 37. The steam and water drum 1 is supported by straps 57 and the drum 7 is supported by suspension rods 58 that may be connected to a fin welded to the drum 7.

If desired, the side walls of the furnace alongside the banks of tubes 2 and 3 may be made as shown in Fig. 3, in which a row of furnace wall tubes 61 extends upwardly from the header 41 to the upper header 62. This header 62 may be connected to the steam space of the steam and water drum 1 or to the pipes or headers 43 by means of a curved pipe similar to the pipe 42.

A row of inclined tubes 65 (Figs. 1, 2, 9 and 10) leads from the lower portion of the separating drum 7 to a feed water header 66 that is located by interrupting the nipples 6 and interposing the header 66. The inlet pipes 67 provided with valves 67' lead to opposite ends of the header 66 and tubes 68 with closed inner ends (Figs. 5 and 10) are located inside of the header 66 and communicate with the inlets 67. Spacing supports 69 keep the tubes 68 at the center of the header 66 and outlet nozzles 70 are provided along the lower sides of the tubes 68 so as to project the feed water into the lower sections of the nipples 6 that lead to the upper ends of the headers 4.

Soot blowers 72 (Figs. 1 and 8) are located among the inclined tubes 2, each one being provided with a steam inlet 73 connected to a distributor 74 that is provided with nozzles 75 on the sides to furnish jets for cleaning the tubes. The inlet 73 and distributor 74 are revoluble and pass through stuffing boxes and are provided with miter gears 76 so that, when the inlets 73 are turned, they will turn the distributor 74 to direct the jets 75 in different directions for cleaning all parts of the tubes.

The superheater 13 (Figs. 1, 6 and 7) is located between the banks of tubes 2 and 3. The steam pipe 12 is connected to the inlet header 77 of the superheater and upper rows of tube 78 lead across the furnace into a header 79 located on the other side, and lower rows of tubes 80 lead from the header 79 to the outlet header 81 that is connected to the steam main.

The steam and water drum 1, the drum 7, and the headers 33, 41 and 37 are fixed in position and the other parts are permitted to move up and down due to expansion and contraction. Slip joints are provided as will be described. A slip joint between the headers 28 and 35 is shown on Figs. 1, 11 and 12. The edge of a plate 82 is welded to the lower side of the header 28 and the edge of a similar plate 83 is welded to the upper side of the header 35, the sides of these plates contacting with each other. One of the plates is provided with slots 84 and bolts 85 pass through the slots in one plate and holes in the other one so that these plates can slide up and down relatively to each other. A baffle 86 is provided on the furnace side of the wall extending from the lower ends of the headers 4 to the cross header 35 to protect the header 28 and the slip joint.

The baffles 9 (Figs. 1, 13 and 14) may be made up of plates 88 with curved flanges 89 to rest against the tubes. Transverse strips 90 extend across the other side of the tubes 2 and the plates 88 are connected thereto by means of the bolts 91, so that the plates can be clamped tightly against the tubes by tightening the nuts on the bolts, making a tight baffle that provides for thermal expansion and contraction.

A modification for increasing the circulation through the natural circulation section of the boiler and for forcing the circulation through the other tubes is shown in Figs. 15 and 16. In this modification, the parts common to those shown in Figs. 17 to 20 already described are designated by the same reference characters. A valved pipe 92 leads from the dry pipe 15 in the steam space of the steam and water drum 1 to the steam turbine 93 that is provided with bearings 94 to resist either thrust or pull on the shaft 19 of the turbine. A valved outlet 95 extends from the turbine 93 to the pipe 12 that leads to the superheater, and a valved by-pass 96 is provided around the turbine 93. A tube or jacket 97 is provided through the steam and water drum 1 through which tube or jacket the shaft 19 of the turbine extends. The upper end of the tube or jacket 97 is welded to the drum and the lower end of the tube or jacket 97 is connected to the inside of the drum by means of a flexible connection 98 so that differences in expansion and contraction between the tube and the drum are provided for. The shaft 19 is connected to the centrifugal pump 22 in the casing 21 in a manner similar to that described in connection with the other embodiment of the invention.

A feed pipe 99 extends longitudinally along the water space of the steam and water drum 1 and is provided with nozzles 100 located so that the feed water will flow from these nozzles directly into the upper ends of the nipples 6. With the embodiment of the invention as indicated in Figs. 15 and 16, the feed water enters through the inlet 99 and passes through the nozzles 100 into the upper ends of the nipples 6, thus causing more rapid circulation through the natural circulation system of the boiler than would be the case if the feed water entered the feed water drum in the usual manner.

The operation is as follows: A fraction or all of the steam that is being passed to the superheater from the steam space of the steam and water drum passes through the turbine 17 (or 93) and drives the same at a speed proportional to the amount of steam passing therethrough. This operates the pump 22, thus drawing water out of the water space of the steam and water drum 1, through the pipe 20 and forcing the water through the branches 24 and 25. The valves in the branches 24 and 25 are regulated to provide the desired proportions of water in the branches 24 and 25. The water passing through the branches 24 is forced into the header 28, from whence it passes into the headers 4, thence upwardly through the inclined tubes to the headers 5, and thence to the drum 7, where steam and water are partially separated, the steam passing into the steam space of the drum 1 through the tubes 8. The water passing through the branches 25 enters the headers 29 and 31. A portion of the water entering the header 29 passes through the rows of slag screen tubes 32 to the headers 33, thence upwardly through the furnace wall cooling tubes 34 and 36 to the headers 35 and 37, respectively. Another portion of the water from the header 29 passes upwardly through the tubes 39 to the headers 35 and 37. The steam and water from the header 35 pass through the tubes 38 to the header 37, from whence they pass through the T's 44 to the pipes or headers 43. A portion of the water from the tubes 25 that enters the headers 30 flows upwardly through the tubes 40 into the headers 41, and thence through connections 42 to the pipes or headers 43. The steam and water that enter the pipes or headers 43 from the headers 41 and 37 flow through the U-tubes 45 to the separating drum 7.

When the feed water header 66 is used, water that is separated in the drum 7 flows through the tubes 65 into the header 66 and joins circulating water that flows downwardly through the downtake headers 4. The valves are provided on opposite sides of the steam turbines 17 and 93 and on opposite sides of the pump 22 and the by-passes are provided around the turbines and the pumps so that the turbines and pumps can be isolated for replacement or repair whenever necessary without stopping the operation of the boiler. When the steam turbines and the pump 22 are shut down, the circulation through both sections of the boiler is natural circulation, or natural combined with accelerated circulation by reason of feed nozzles 100.

I claim:

1. In a water tube boiler provided with a superheater, a natural circulation system comprising a steam and water drum, downtake and uptake headers and a bank of tubes connecting said headers, means to cause increased circulation through said system above that which would be caused by gravity by projecting feed water downwardly into said downtake headers, a connection from the water space of said steam and water drum to the lower ends of said downtake headers, and a pump in said connection driven by a turbine that is located in a steam connection from the steam space of said steam and water drum to the superheater of said boiler.

2. In a water tube boiler provided with a superheater, a natural circulation system comprising a steam and water drum, downtake and uptake headers and a bank of tubes connecting said headers, means to cause increased circulation through said system above that which would be caused by gravity by projecting feed water downwardly into said downtake headers, a connection from the water space of said steam and water drum to the lower ends of said downtake headers, a pump in said connection driven by a turbine that is located in a steam connection from the steam space of said steam and water drum to the superheater of said boiler, and by-passes around said pump and turbine.

3. In a water tube boiler provided with a superheater, a natural circulation system comprising a steam and water drum, downtake and uptake headers and a bank of tubes connecting said headers, means to cause increased circulation through said system above that which would be caused by gravity by projecting feed water downwardly into said downtake headers, a connection from the water space of said steam and water drum to the lower ends of said downtake headers, and a pump in said connection driven by a turbine that is located in a steam connection from the steam space of said steam and water drum to the superheater of said boiler, said turbine being supported by said drum.

4. In a water tube boiler, a natural circulation system comprising a steam and water drum, vertically disposed downtake and uptake headers and a bank of tubes connecting said headers, a second circulation system, and means comprising a pump and a by-pass to provide either natural circulation or forced circulation through said second system, said pump being driven by a turbine located in a connection between the steam space of said steam and water drum and the superheater of said boiler.

5. In a water tube boiler, a natural circulation system, a second circulation system, means to provide either natural or forced circulation through said second system, and means whereby the means to provide forced circulation through the second system may be utilized to increase the circulation in the natural circulation system.

6. In a water tube boiler, a natural circulation system, a second circulation system through which natural circulation may take place, a pump in said second system to provide forced circulation through said second system, and means whereby said pump may be utilized to increase the circulation in the natural circulation system.

7. In a water tube boiler, a natural circulation system, a second circulation system through which natural circulation may take place, a pump in said second system to provide forced circulation through said second system, and a branch leading from said pump to said first circulation system.

8. In a water tube boiler, a natural circulation system, a second circulation system through which natural circulation may take place, a pump in said second system to provide forced circulation through said second system, a branch leading from said pump to said first circulation system, and means for introducing feed water into said natural circulation system.

9. In a water tube boiler, a natural circulation system, a second circulation system through which natural circulation may take place, and a pump and connections so arranged with respect to said systems that forced or natural circulation may take place in the first system while forced circulation takes place in the second.

BENJAMIN B. WHITTAM.